United States Patent Office 2,892,815
Patented June 30, 1959

2,892,815
STANNOUS FORMATE CATALYST FOR PREPARING POLYETHYLENE TEREPHTHALATE

Patrick H. Hobson, Decatur, Ala., assignor to The Chemstrand Corporation, Decatur, Ala., a corporation of Delaware No Drawing. Application April 11, 1955
Serial No. 500,686

8 Claims. (Cl. 260—75)

This invention relates to an improved method for preparing a synthetic linear polyester, such as the condensation product of a polyhydric alcohol and a dibasic acid. More particularly, the invention is concerned with an improved method for the preparation of polyethylene terephthalate.

Synthetic linear condensation polyesters derived from glycols and dibasic acids, which are capable of being drawn into pliable, strong fibers showing, by characteristic X-ray patterns, orientation along the fiber axis, are well known. Having such properties, these polyesters have proven to be of considerable value commercially, and particularly is this true of those polyesters formed from terephthalic acid and a glycol of the series $$HO(CH_2)_nOH$$

where $n$ is an integer from 2 to 10 inclusive. One of the most attractive polyesters of polymers of this class is polyethylene terephthalate. One of the best methods of producing polyethylene terephthalate involves an ester interchange between ethylene glycol and dimethyl terephthalate to form bis-2-hydroxyethyl terephthalate monomer which is then polymerized to polyethylene terephthalate under reduced pressure and at elevated temperatures.

However, difficulties have been encountered in the manufacture of polyethylene terephthalate by the ester interchange reaction. Obviously highly purified dimethyl terephthalate and highly purified ethylene glycol are preferred starting materials in order to form a uniform high quality product. It has been noted, however, that even these highly purified materials are very sluggish with respect to ester interchange and in the case of less purified reagents, the reaction is still too slow for practical commercial operation. Because of this slow rate of reaction, it has been found to be essential, in commercial operation, to employ a suitable catalyst to speed up the reaction.

Many catalysts have heretofore been proposed for the ester interchange reaction in the manufacture of polyethylene terephthalate. These catalysts have not proven to be entirely satisfactory, since many of the known catalysts are not capable of producing condensation polymers having a sufficiently high molecular weight within a commercially feasible period of time. Therefore, there has been a great desire in the art to find an ester interchange catalyst which not only speeds up the reaction into the realm of that considered necessary for economic commercial operation and which is useful over approximately the entire range of molecular weights desired in the finished polymer but also, a catalyst which produces a condensation polymer of satisfactory color or whiteness.

Accordingly, it is a primary object of the present invention to provide a new and improved process for producing polyethylene terephthalate which overcomes the disadvantages of prior art processes and produces a product of improved properties, not only in the condensation polymer but also in articles produced therefrom.

It is another object of the invention to provide a new catalyst which accelerates the ester interchange reaction between ethylene glycol and dimethyl terephthalate.

It is a still further object of the invention to improve the reactions involved in the production of fiber- and filament-forming linear condensation polyesters formed from ethylene glycol and dimethyl terephthalate with respect to accelerating the same by means of a new catalyst.

Other objects and advantages of the present invention will be apparent from the description thereof hereinafter.

The objects of the present invention are in general accomplished by conducting the ester interchange reaction between ethylene glycol and dimethyl terephthalate, and the subsequent polymerization of the resulting bis-2-hydroxyethyl terephthalate, in the presence of catalytic amounts of stannous formate, which has the formula:

$$Sn(HCOO)_2$$

In the preparation of polyethylene terephthalate, by means of the ester-interchange reaction, the method comprises two steps. In the first step, ethylene glycol and dimethyl terephthalate are reacted at elevated temperatures and atmospheric pressure to form bis-2-hydroxyethyl terephthalate monomer and methanol, which is removed continuously by distillation. Thereafter, in the second step, the bis-2-hydroxyethyl terephthalate is heated at still higher temperatures and under reduced pressure to form the polyethylene terephthalate with the elimination of glycol, which is readily volatilized under these conditions and removed from the system. The second step, or polymerization step, is continued until a fiber-forming polymer having the desired degree of polymerization, determined by viscosity measurements, is obtained. Without the aid of a suitable catalyst, the above reactions do not proceed at a noticeable rate.

The present invention proposes conducting both steps of the above-identified reaction in the presence of catalytic amounts of stannous formate. A reasonably wide range of catalyst concentration may be employed, for example, 0.01 to 1.0% by weight, based on the weight of the dimethyl terephthalate. It is preferred, however, especially when producing fiber-forming linear condensation polyesters, to employ the catalyst in the range of 0.01 to 0.10% by weight.

During the first stage or initial condensation a simple ester-interchange takes place with the formation of bis-2-hydroxyethyl terephthalate. This portion of the reaction is carried out at atmospheric pressure and at a temperature in the range of 100° to 250° C. and preferably between 150° and 220° C. If desired, the reaction may be carried out at pressures above or below atmospheric. Atmospheric pressure is preferred, however. During this first stage, methanol is evolved which is continually removed by distillation. At this completion of the first stage, the excess glycol, if any, is distilled off prior to entering the second stage of the reaction.

The second stage, or polymerization stage, is conducted at reduced pressures. For optimum results, a pressure within the range of less than 1 mm., up to 5 mm. of mercury is employed. This reduced pressure is necessary to remove the free ethylene glycol that is formed during this stage of the reaction. The ethylene glycol is volatilized under these conditions and removed from the system. The polymerization step is conducted at a temperature within the range of 220° to 300° C. It is desirable to maintain a nitrogen blanket over the reactants in order to prevent oxidation, said nitrogen containing less than 0.003% oxygen.

The polymerization step or second stage may be effected either in the liquid, melt or solid phase. In the liquid phase, particularly, reduced pressures must be employed in order to remove the free ethylene glycol which emerges from the polymer as a result of the condensation reaction.

When employing procedures heretofore known in the art, the ester interchange portion of the reaction, or first step, has taken place in approximately 3 to 6 hours. However, when employing the process of the instant invention, using the new catalyst disclosed herein, the ester interchange takes place in ¾ to 2 hours. Likewise, the polymerization or second step has heretofore taken place in approximately 2 to 4 hours, depending on catalyst concentration, temperature, viscosity desired, amount of color allowable in the finished polyester, etc. With the present process the polymerization step takes place in approximately 1 to 3 hours when employing the new catalyst of the present invention and the conditions of reaction recited hereinbefore.

The linear condensation polyesters, produced in accordance with the present invention, have a melt viscosity of approximately 1,000 to 10,000 poises. This represents the fiber- and filament-forming polymers. It is to be understood, of course, that non fiber-forming polyesters may be produced by means of the present invention, which have a greater or less melt viscosity than that reiterated above. For example, polyesters which are useful in coating compositions, lacquers, and the like.

Melt viscosity, of the polymer, as referred to herein, is measured by timing the flow of the molten polymer through a glass tube between two reference points marked on the tube by applying a known pressure difference, as measured by a monometer. This is a direct application of Flory's method, and by using the following expression, the melt viscosity in poises can be determined.

$$\text{Melt viscosity (poises)} = \Delta P_{corr.} \cdot t \cdot C$$

Where $\Delta P_{corr.}$ = corrected pressure differential (mm.)
$t$ = time of flow between reference points (seconds)
$C$ = calibrated constant $$\Delta P_{corr.} = \frac{\Delta P - D(H_1 + H_2)}{27.6}$$

where $\Delta P$ = observed pressure differential
$H_1$ = height (mm.) of lower reference point above melt surface
$H_2$ = height (mm.) of upper reference point above melt surface
$D$ = density of molten polymer at the temperature of the melt $$C = \frac{106A}{h_2^2 - h_1^2}$$

where $A$ = cross-section area of tube in cm.$^2$
$h_1 = H_1$ in cm.
$h_2 = H_2$ in cm.

When employing the catalyst of the instant invention, melt viscosities, which are much higher than those possible with prior art catalysts, are obtainable.

To further illustrate the present invention and the advantages thereof, the following example is given, it being understood that this is merely intended to be illustrative and not limitative. Unless otherwise indicated, all parts and percents are by weight.

*Example I*

A mixture of 20 grams of dimethyl terephthalate, 22 ml. of ethylene glycol and 25 mg. of stannous formate were placed in a reaction vessel fitted with a distilling column and heated under a nitrogen atmosphere at 177° C. for a period of 1½ hours. The methanol was evolved at a rapid rate and removed from the reaction vessel by distillation. The rapid evolution of methanol indicated that stannous formate is a good first stage catalyst. After all the methanol was removed, the system was placed under a vacuum and the pressure therein reduced to less than 1 mm. mercury while the temperature was increased to 285° C. The second or polymerization stage was allowed to proceed for approximately 50 minutes. The ethylene glycol formed during the polymerization stage was distilled off and collected. After 50 minutes the reaction mass had become quite thick and the polymer obtained had a melt viscosity of 1,000 poises at 287° C. Cold-drawable filaments were obtained from the polymer melt. This indicated that the stannous formate was also a good second stage polymerization catalyst. A control polymer was made in accordance with the above procedure using zinc borate as the catalyst. The control polymer so obtained had a melt viscosity of approximately 600 poises at 287° C. thus showing the superior product obtainable with the catalyst of the present invention.

The catalyst of the instant invention is more reactive or produces greater activity than catalysts proposed heretofore for the manufacture of polyethylene terephthalate by the ester interchange route. This increased catalyst activity is clearly evidenced by the extremely rapid release of methanol during the first stage of the reaction. The increased activity of the instant catalyst is in part due to the fact that it is soluble in the reaction mixture, whereas some of the prior art catalysts, for example, zinc borate, are not readily soluble and tend to build up in activity as they dissolve. Likewise, the various oxides, proposed heretofore, are very sluggish in activity. These factors affect the color of the finished product since the longer the reaction mass is submitted to high temperatures, the more likely it is that discoloration of the polymer and articles produced therefrom will result.

The polymers produced by the present invention and shaped articles produced therefrom, such as fibers, filaments, films, and the like, have improved color over the polymers and shaped articles produced by prior art procedures. One skilled in the art will be readily cognizant of this particular advantage. This is particularly true in the textile field where in order to dye goods in pastel shades, a white fiber or yarn is necessary, since when a yarn is off-color when spun, off-color shades will result when such yarn, or material made therefrom, is dyed. The use of off-color yarn necessitates a bleaching step which increases the cost and very often detracts from other desirable properties of the product.

Another important advantage of the instant new catalyst is that it is not affected by the amount of water that is normally present in ethylene glycol which also contributes to the improved color of the finished product. Since the instant catalyst is not affected by the water normally present during the esterification, there is faster activity during the first stage of the reaction which also contributes to the improved color of the finished product. Numerous other advantages of the instant invention will be apparent to those skilled in the art.

It is to be understood that changes and variations may be made in the present invention without departing from the spirit and scope thereof as defined in the appended claims.

I claim:

1. A process for producing polyethylene terephthalate comprising, reacting ethylene glycol and dimethyl terephthalate in the presence of a catalytic amount of stannous formate at a temperature in the range of about 100° to 250° C. until no further methanol is liberated, and then continuing the reaction in the presence of said stannous formate at a temperature in the range of about 220° to 300° C. and under reduced pressure until the thus-formed polyethylene terephthalate has a melt viscosity of about 1,000 to 10,000 poises.

2. A process for producing fiber-forming polyethylene terephthalate comprising, reacting ethylene glycol and dimethyl terephthalate in the presence of 0.01 to 1.0% by weight of stannous formate, based on the weight of dimethyl terephthalate, at a temperature in the range of about 100° to 250° C. until no further methanol is liberated, and then continuing the reaction in the presence of said stannous formate at a temperature in the range of about 220° C. to 300° C. and under reduced pressure until the thus-formed polyethylene terephthalate has a melt viscosity of about 1,000 to 10,000 poises.

3. A process for producing fiber-forming polyethylene terephthalate comprising, reacting ethylene glycol and dimethyl terephthalate in the presence of 0.01 to 0.10% by weight of stannous formate, based on the weight of dimethyl terephthalate, at a temperature in the range of 150° to 220° C. until no further methanol is liberated, and then continuing the reaction in the presence of said stannous formate at a temperature in the range of 220° to 300° C. and under reduced pressure until the thus-formed polyethylene terephthalate has a melt viscosity of about 1,000 to 10,000 poises.

4. The process as defined in claim 3 wherein the reduced pressure is in the range of less than 1 mm. up to 5 mm. of mercury.

5. The process as defined in claim 3 wherein the reaction at 150° to 220° C. is conducted for ¾ to 2 hours and the reaction at 220° to 300° C. is conducted for 1 to 3 hours.

6. The process as defined in claim 5 wherein the reduced pressure is in the range of less than 1 mm. up to 5 mm. of mercury.

7. In the process for producing bis-2-hydroxyethyl terephthalate by the reaction of ethylene glycol with dimethyl terephthalate, the improvement comprising reacting ethylene glycol with dimethyl terephthalate in the presence of a catalytic amount of stanous formate at a temperature in the range of 150° to 220° C. until no further methanol is liberated.

8. The process as defined in claim 7 wherein there is employed 0.01 to 1.0% by weight of stannous formate based on the weight of the dimethyl terephthalate.

References Cited in the file of this patent
UNITED STATES PATENTS 2,720,507    Caldwell _____ Oct. 11, 1955